United States Patent
Gustavsson et al.

(10) Patent No.: US 12,218,720 B2
(45) Date of Patent: Feb. 4, 2025

(54) MULTI-USER PRE-CODING

(71) Applicant: Telefonaktiebolaget LM Ericsson (publ), Stockholm (SE)

(72) Inventors: Ulf Gustavsson, Gothenburg (SE); Alex Alvarado, Den Bosch (NL); Frans M. J. Willems, Geldrop (NL); Amirashkan Farsaei, Eindhoven (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/914,167

(22) PCT Filed: Apr. 1, 2020

(86) PCT No.: PCT/EP2020/059238
§ 371 (c)(1),
(2) Date: Sep. 23, 2022

(87) PCT Pub. No.: WO2021/197594
PCT Pub. Date: Oct. 7, 2021

(65) Prior Publication Data
US 2023/0125744 A1    Apr. 27, 2023

(51) Int. Cl.
H04B 7/04        (2017.01)
H04B 7/0456      (2017.01)
(Continued)

(52) U.S. Cl.
CPC .......... *H04B 7/0456* (2013.01); *H04W 52/24* (2013.01); *H04B 7/0452* (2013.01)

(58) Field of Classification Search
CPC .... H04B 7/0456; H04B 7/0452; H04W 52/24
(Continued)

(56) References Cited

U.S. PATENT DOCUMENTS

2013/0301551 A1   11/2013  Ghosh et al.
2014/0010151 A1*  1/2014   Wei ...................... H04B 7/0456
                                                            370/328
(Continued)

FOREIGN PATENT DOCUMENTS

CN          108418614 A      8/2018

OTHER PUBLICATIONS

Farsaei et al (US an Improved Dropping Algorithm for Line-of-Sight Massive MIMO with Max-Min Power Control, IEEE communication letters, IEEE Service Center, Piscataway, NJ, US, vol. 23, No. 6, Jun. 1, 2019 (Jun. 1, 2019), pp. 1109-1112, XP011728834, ISSN: 1089-7798, DOI: 10.1109/LCOMM 2019.2912601) (Year: 2019).*

(Continued)

*Primary Examiner* — Kevin M Burd
(74) *Attorney, Agent, or Firm* — Rothwell, Figg, Ernst & Manbeck, P.C.

(57) ABSTRACT

A pre-coding method is disclosed of a multi-user, multi-antenna transmitter configured for transmission of respective signals to a plurality of users. The method comprises determining (for each pair of users of the plurality) a spatial correlation value for the pair of users, sorting the plurality of users into a first group and a second group based on the spatial correlation values, generating the respective signals for transmission to the users of the first group by application of linear pre-coding, and generating the respective signals for transmission to the users of the second group by application of non-linear precoding. For example, a particular user may be sorted into the first group when all pairs comprising the particular user have a spatial correlation value that falls below a first correlation threshold value, and the particular user may be sorted into the second group when at least one pair comprising the particular user has a spatial (Continued)

correlation value that falls on or above the first correlation threshold value. Corresponding apparatus, transmitter, base station and computer program product are also disclosed.

20 Claims, 3 Drawing Sheets

(51) Int. Cl.
  *H04W 52/24* (2009.01)
  *H04B 7/0452* (2017.01)
(58) Field of Classification Search
  USPC .......................................................... 375/262
  See application file for complete search history.

(56) References Cited

U.S. PATENT DOCUMENTS

| | | |
|---|---|---|
| 2014/0185564 A1 | 7/2014 | Dong et al. |
| 2014/0204841 A1 | 7/2014 | Ruiz Delgado et al. |
| 2016/0226563 A1 | 8/2016 | Kohli |
| 2021/0176820 A1 | 6/2021 | Zang et al. |
| 2023/0125744 A1 | 4/2023 | Gustavsson et al. |
| 2023/0155643 A1 | 5/2023 | Gustavsson et al. |

OTHER PUBLICATIONS

U.S. Appl. No. 17/918,327 (Year: 2020).*
Machine translation for CN-108418614-A (Year: 2018).*
Xu, P. et al., "NOMA: An Information Theoretic Perspective", IEEE, arXiv:1504.07751v2 [cs.IT], May 12, 2015 (6 pages).
Willebrand, H. A. et al., "Fiber Optics Without Fiber" Beaming light through the air offers the speed of optics without the expense of fiber, IEEE Spectrum, Aug. 2001 (6 pages).
3GPP TS 36.216 V14.0.0 (Mar. 2017), 3rd Generation Partnership Project; Technical Specification Group Radio Access Network; Evolved Universal Terrestrial Radio Access (E-UTRA); Physical layer for relaying operation (Release 14) Mar. 2017 (16 pages).
International Search Report and Written Opinion issued in International Application No. PCT/EP2020/059238 dated Nov. 26, 2020 (12 pages).
Farsael, A. et al., "An Improved Dropping Algorithm for Line-of-Sight Massive MIMO with Max-Min Power Control", IEEE, vol. 23, No. 6, Jun. 2019 (5 pages).
Non-Final Office Action dated Jan. 31, 2024 in related U.S. Appl. No. 17/915,327 (15 pages).

* cited by examiner

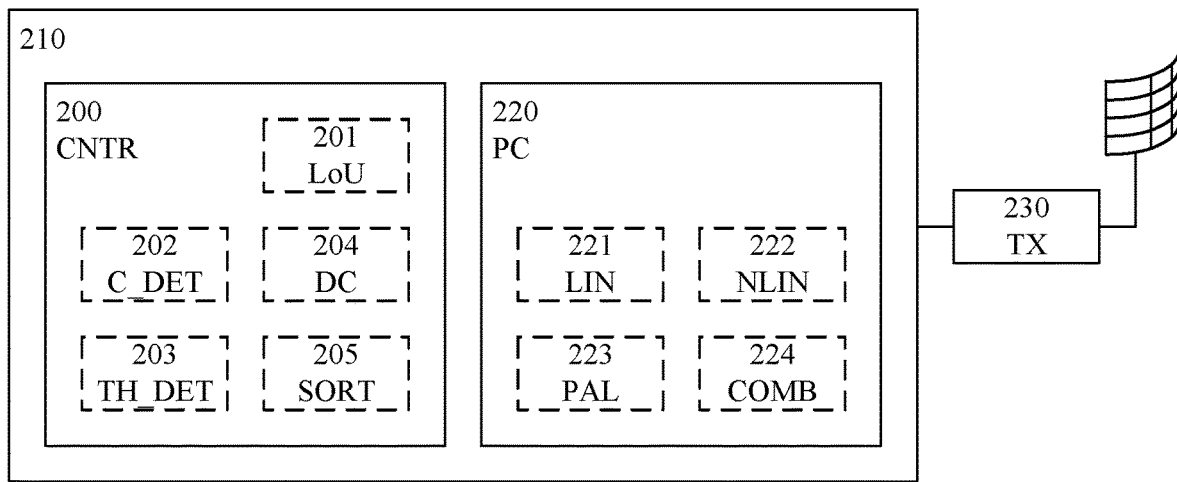
FIG. 2
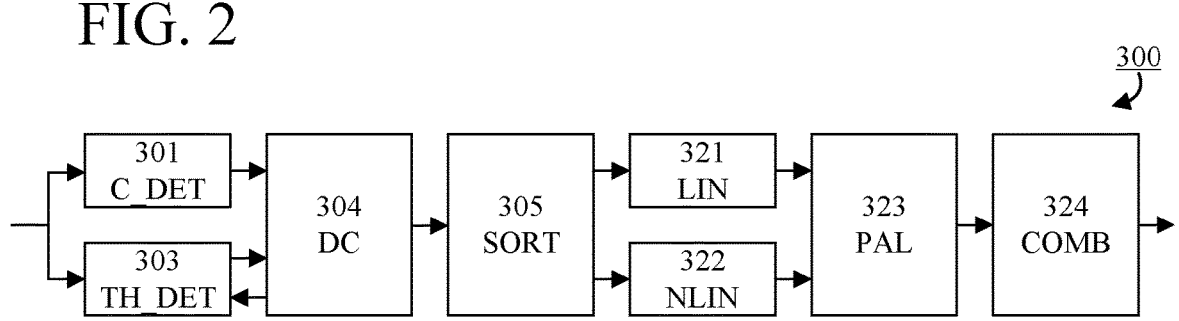
FIG. 3
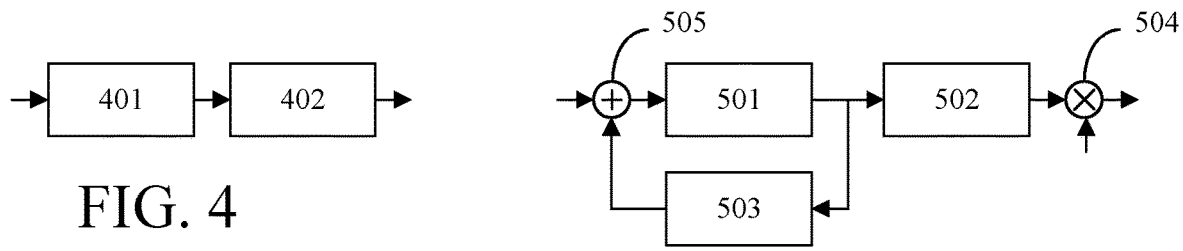
FIG. 4
FIG. 5
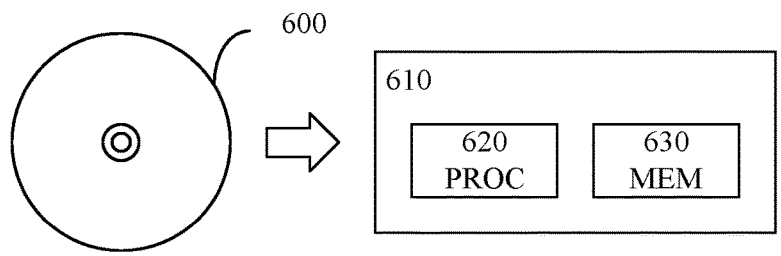
FIG. 6

MULTI-USER PRE-CODING

CROSS REFERENCE TO RELATED APPLICATIONS

This application is a 35 U.S.C. § 371 National Stage of International Patent Application No. PCT/EP2020/059238, filed 2020 Apr. 1.

TECHNICAL FIELD

The present disclosure relates generally to the field of wireless communication. More particularly, it relates to pre-coding for a multi-user, multi-antenna transmitter.

BACKGROUND

Pre-coding for multi-user, multi-antenna transmitters is often implemented using linear pre-coding (e.g., conjugate beamforming—CB, zero-forcing—ZF—beamforming, or minimum mean square error—MMSE—beamforming). A problem with linear pre-coding is that its performance typically worsens with increasing correlation between users.

Non-linear pre-coding may be applied for multi-user, multi-antenna transmitters to address correlation between users. A problem with non-linear pre-coding is that it entails higher complexity than linear pre-coding. The non-linear pre-coding complexity may, for example, increase with increasing correlation between users.

Therefore, there is a need for alternative approaches to pre-coding for multi-user, multi-antenna transmitters. Preferably, such alternative approaches are suitable (e.g., provide good performance) in situations with high correlation between users. Also preferably, such alternative approaches are less complex than non-linear pre-coding.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a pre-coding method of a multi-user, multi-antenna transmitter configured for transmission of respective signals to a plurality of users.

The method comprises determining (for each pair of users of the plurality) a spatial correlation value for the pair of users, and sorting the plurality of users into a first group and a second group based on the spatial correlation values.

The method also comprises generating the respective signals for transmission to the users of the first group by application of linear pre-coding, and generating the respective signals for transmission to the users of the second group by application of non-linear pre-coding.

In some embodiments, determining the spatial correlation value for a pair of users comprises calculating a normalized scalar product between channel estimates associated with the users of the pair.

In some embodiments, the linear pre-coding comprises one of a conjugate beamforming approach, a zero-forcing approach, and a minimum mean square error approach.

In some embodiments, the non-linear pre-coding comprises one of a Tomlinson-Harashima pre-coding approach, and a vector pre-coding approach.

In some embodiments, the method further comprises determining a first power allocation coefficient for the first group and a second power allocation coefficient for the second group. Then, generating the respective signals for transmission to the users of the first group comprises scaling by the first power allocation coefficient and generating the respective signals for transmission to the users of the second group comprises scaling by the second power allocation coefficient.

In some embodiments, the method further comprises combining the respective signals for transmission to the users of the first group with the respective signals for transmission to the users of the second group to provide a combined signal, and transmitting the combined signal.

In some embodiments, sorting the plurality of users into the first group and the second group comprises sorting a particular user into the first group when all pairs comprising the particular user have a spatial correlation value that falls below a first correlation threshold value.

In some embodiments, sorting the plurality of users into the first group and the second group comprises sorting the particular user into the second group when at least one pair comprising the particular user has a spatial correlation value that falls on or above the first correlation threshold value.

In some embodiments, the first correlation threshold value is based on at least one of: the number of users of the plurality and a user-specific signal-to-noise ratio relating to the plurality of users. In some embodiments, user-specific signal-to-noise ratio may be based on the number of users of the plurality, a total power at the transmitter, a large-scale fading metric of the user, and a noise power at the receiver of the user.

In some embodiments, the method further comprises (when one or more pairs of users has a spatial correlation value that falls on or above a second correlation threshold value) discarding at least one user comprised in at least one of the one or more pairs.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a pre-coding apparatus for a multi-user, multi-antenna transmitter configured for transmission of respective signals to a plurality of users. The apparatus comprises controlling circuitry.

The controlling circuitry is configured to cause determination (for each pair of users of the plurality) of a spatial correlation value for the pair of users, sorting of the plurality of users into a first group and a second group based on the spatial correlation values, generation of the respective signals for transmission to the users of the first group by application of linear pre-coding, and generation of the respective signals for transmission to the users of the second group by application of non-linear pre-coding.

A fourth aspect is a multi-user, multi-antenna transmitter comprising the pre-coding apparatus of the third aspect.

A fifth aspect is a base station comprising the multi-user, multi-antenna transmitter of the fourth aspect and/or the pre-coding apparatus of the third aspect.

In some embodiments, any of the above aspects may additionally have features identical with or corresponding to any of the various features as explained above for any of the other aspects.

An advantage of some embodiments is that alternative approaches to pre-coding for multi-user, multi-antenna transmitters are provided.

Another advantage of some embodiments is that approaches to pre-coding for multi-user, multi-antenna transmitters are provided that are suitable in situations with high correlation between users. For example, the pre-coding performance may be superior to linear pre-coding while the complexity is lower than for non-linear pre-coding.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 2 is a schematic block diagram illustrating an example apparatus according to some embodiments;

FIG. 3 is a schematic block diagram illustrating an example apparatus according to some embodiments;

FIG. 4 is a schematic block diagram illustrating example linear pre-coding according to some embodiments;

FIG. 5 is a schematic block diagram illustrating example non-linear pre-coding according to some embodiments;

FIG. 6 is a schematic drawing illustrating an example computer readable medium according to some embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, linear pre-coding for multi-user, multi-antenna transmitters may not always provide acceptable performance when correlation between users is prominent, while non-linear pre-coding for multi-user, multi-antenna transmitters may entail unacceptably high complexity.

Generally when used herein, the term "performance" may refer to any one or more suitable performance metric. For example, performance may refer to one or more of: capacity, overall throughput, throughput per user, bit error rate (BER), block error rate (BLER), spectral efficiency, and the like.

Also generally when used herein, the term "complexity" may refer to any one or more suitable complexity metric. For example, complexity may refer to one or more of: computational complexity (e.g., number of operations, etc.), hardware usage (e.g., time, power, energy, processing capacity, etc.), latency, and the like.

In the following embodiments will be described where alternative approaches to pre-coding for multi-user, multi-antenna transmitters are provided for acceptable performance and complexity when correlation between users is prominent.

Various embodiments may be particularly suitable for use in massive-MIMO (multiple-input, multiple-output) systems.

Figure 1:
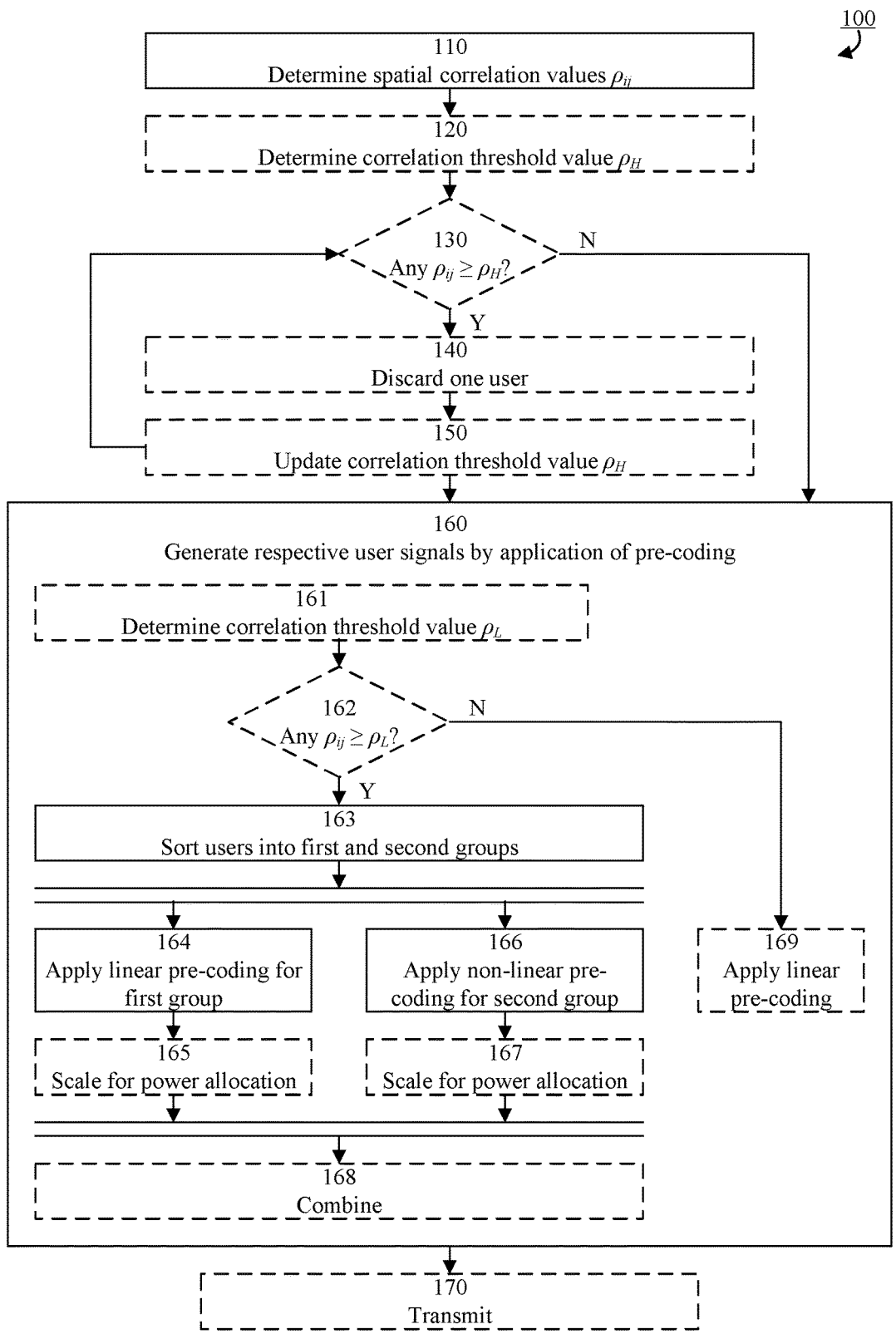
FIG. 1 is a flowchart illustrating example method steps according to some embodiments.

FIG. 1 illustrates an example method 100 according to some embodiments. The example method is a pre-coding method of a multi-user, multi-antenna transmitter configured for transmission of respective signals to a plurality of users. For example, the multi-user, multi-antenna transmitter may be comprised in a base station.

The method starts in step 110 where a spatial correlation value is determined for each pair of users of the plurality. The spatial correlation value for a pair of users is typically determined as a pairwise spatial correlation coefficient between the users of the pair.

The spatial correlation value for a pair of users may be determined by calculating a normalized scalar product between channel estimates associated with the users of the pair. For example, if a channel matrix $H=[h_1, \ldots, h_K]T$, where K represents the number of users in the plurality of users, is known or estimated at the transmitter (e.g., based on channel state information—CSI), the spatial correlation values may be determined via a sample covariance matrix $A=HH^T$. The spatial correlation value $\rho_{ij}$ for the pair comprising user i and user j, may be determined by calculation of $$\rho_{ij} = \frac{a_{ij}}{\|h_i\|\|h_j\|},$$

where $\alpha_{ij}$ is element ij of the matrix A (scalar/dot/inner product between channel estimates $h_i$ and $h_j$) and the division by $\|h_i\|\|h_j\|$ provides normalization such that $\rho_{ij}$ is in the range [0, 1].

In some embodiments, the method may then comprise reducing the plurality of users before proceeding to generation of the respective signals for transmission to the users of the plurality of users. Reducing the plurality may, for example, improve sum-rate and/or energy efficiency compared to conventional approaches. Put differently, a certain performance (e.g., BER) may be obtained with less transmit power. The energy efficiency may also be improved.

For example, US 2018/0352523 A1 describes active user selection in massive MIMO, wherein a terminal is selected to drop from service based on channel correlations. Such an approach may be used to reduce the plurality of users and thereby correlation between active users. In some situations, however, the correlation reduction achieved by application of the approach of US 2018/0352523 A1 may be insufficient for achievement of acceptable complexity and/or performance.

Reducing the plurality of users may, for example, be implemented by comparing the spatial correlation values to a threshold value $\rho_H$ (also termed herein as a second correlation threshold value) and, when one or more pairs of users has a spatial correlation value that falls on or above the threshold value $\rho_H$, discarding at least one user comprised in at least one of the one or more pairs.

In prior art approaches, a stationary and predetermined threshold value $\rho_H$ has been used, or threshold values $\rho_H$ have been found by simulations. There are, however, alternative approaches to determining a suitable threshold value $\rho_H$ as will be described herein.

Thereby, the selection of which user(s) to drop may be more adequate than if the approach of US 2018/0352523 A1 was used; thereby providing a more prominent decrease in correlation (entailing higher performance and/or lower complexity).

Furthermore, by using the thresholds (e.g., as upper bounds) as proposed in some embodiments herein, the complexity burden may be reduced compared to the approach of US 2018/0352523 A1 where a search for the best thresholds needs to be performed.

Figure 7:
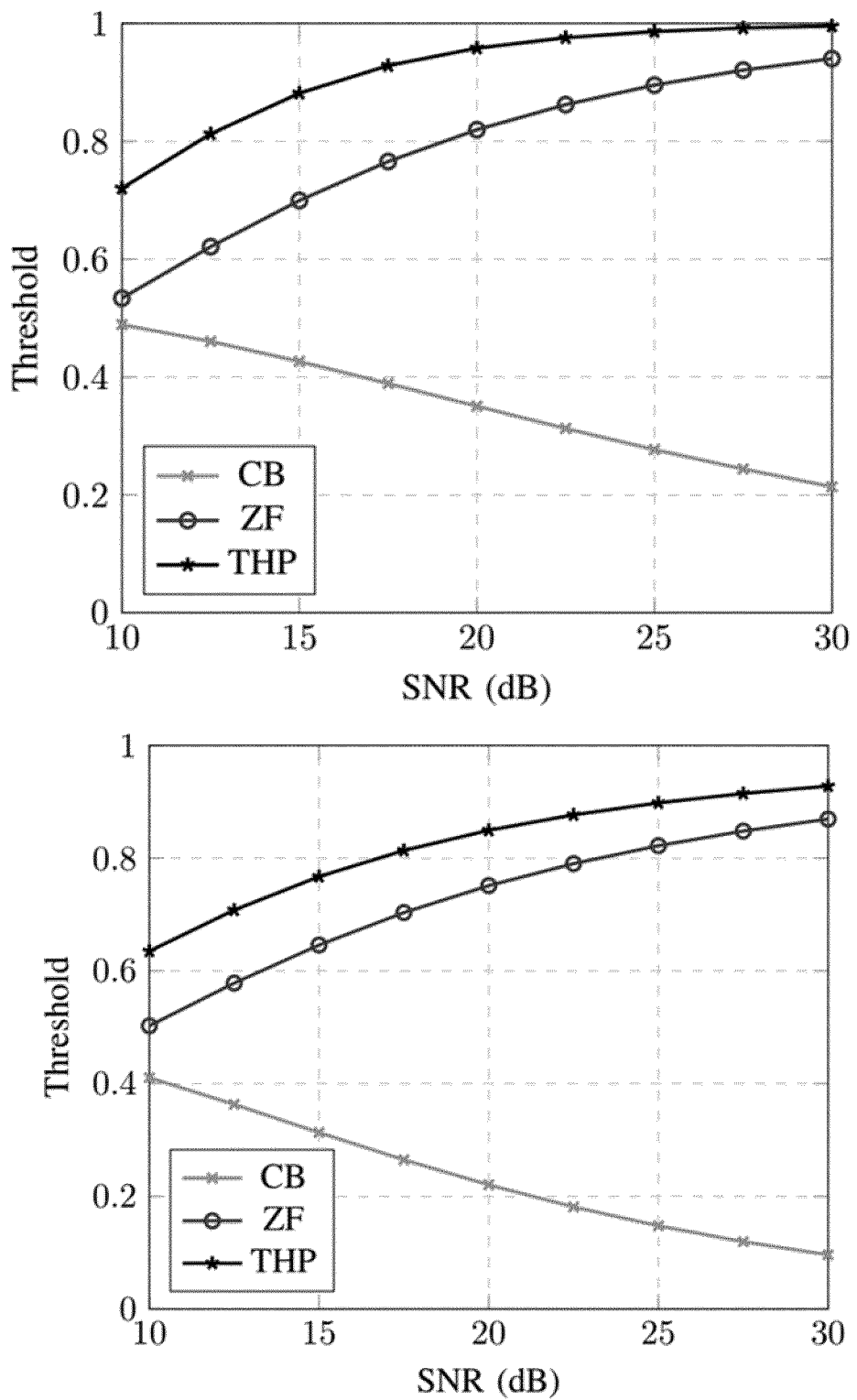
FIG. 7 are plots illustrating example threshold values according to some embodiments.

Moreover, in the approach of US 2018/0352523 A1, a single threshold is used for both CB and ZF, while some embodiments of the current disclosure propose that the thresholds for CB, ZF, and THP may be different (see e.g., FIG. 7).

Typically, the threshold value $\rho_H$ may be determined based on the number K of users of the plurality (i.e., the cardinality of the plurality), and may be further based on a user-specific signal-to-noise ratio (SNR) relating to the plurality of users. The user-specific signal-to-noise ratio may, for example, be based on the number of users of the plurality (K), a total power at the transmitter ($P_{tot}$), a large-scale fading metric of the user ($\|h_i\|$ for user i), and a noise power at the receiver of the user ($N_0$); e.g., $$SNR = \frac{\zeta P_{tot}}{K N_0},$$

where $$\zeta = \frac{P_{tot}}{\sum_{i=1}^{K} \frac{1}{\|h_i\|^2}}.$$

Assuming two correlated users out of K users, power allocation which equalizes the SNR for all users when they are orthogonal, and that the correlated users are at the same distance to the transmitter, the threshold value $\rho_H$ may be determined as exemplified below.

Power allocation which equalizes the SNR for all users when they are orthogonal may be implemented by allocating the following power for each user i:

$$d_i = \frac{P_{tot}}{N_0 \sum_{j=1}^{K} \frac{\|h_i\|^2}{\|h_j\|^2}}$$

which translates to equal (uniform) power allocation when all users have the same large-scale fading coefficient.

For conjugate beamforming (CB), the threshold value $\rho_H$ may be determined as $$\rho_H = \rho_{equ.}^{CB}$$

where $\rho_{equ.}^{CB}$ is found by solving the following quadratic equation $\rho_{equ.}^{CB} = x$:

$$x^4 \left( \frac{\zeta^2}{N_0^2} (2^{\alpha_{equ.}} - 1) \right) +$$

$$x^2 \left( \frac{\zeta}{N_0} \left( \beta + \frac{1}{\beta} \right) \left( 2^{\alpha_{equ.}} - 1 - \frac{\zeta}{N_0} \right) \right) + 2^{\alpha_{equ.}} - 1 - 2\frac{\zeta}{N_0} - \frac{\zeta^2}{N_0^2} = 0,$$

where $$\zeta = \frac{P_{tot}}{\sum_{i=1}^{K} \frac{1}{\|h_i\|^2}}, \beta = \frac{\|h_{K-1}\|^2}{\|h_K\|^2}, \text{ and}$$

$$\alpha_{equ.} = R_{DU} - (K-2)\log_2\left(1 + \frac{\zeta}{N_0}\right),$$

$$R_{DU} = (K-1)\log_2\left(1 + \frac{P_{tot}}{N_0 \sum_{i=1}^{K-1} \frac{1}{\|h_i\|^2}}\right).$$

In some embodiments, the threshold value $\rho_H$ may be determined as $$\rho_H = \rho_{equ.}^{CB} = \left( \frac{1}{\sqrt{\alpha} - 1} - \frac{1}{SNR} \right)^{0.5}$$

for conjugate beamforming (CB).

For zero-forcing (ZF) beamforming, the threshold value $\rho_H$ may be determined as $$\rho_H = \rho_{equ.}^{ZF} = \left( 1 - \frac{N_0}{\zeta}\left(\sqrt{2^{\alpha_{equ.}}} - 1\right) \right)^{0.5}.$$

In some embodiments, the threshold value $\rho_H$ may be determined as $$\rho_H = \rho_{equ.}^{ZF} = \rho^{CB}(\sqrt{\alpha} - 1)^{0.5}$$

for zero-forcing (ZF) beamforming, wherein $$\alpha = \left( 1 + \frac{SNR}{(K-1)(1+SNR)} \right)^{K-2} \left( 1 + SNR\frac{K}{K-1} \right).$$

For Tomlinson-Harashima pre-coding (THP), the threshold value $\rho_H$ may be determined as $$\rho_H = \rho_{equ.}^{THP} = \left( 1 - \frac{N_0}{\zeta}(2^{\alpha_{THP,equ.}} - 1) \right)^{0.5}$$

where $$\alpha_{THP,equ.} = R_{DU} - (K-1)\log_2\left(1 + \frac{\zeta}{N_0}\right),$$

$P_{tot}$ is the total allocated power, and $N_0$ is the noise power at the receiver of a user.

Assuming two correlated users out of K users, and max-min power allocation control, the threshold value $$\rho_H = \rho_{max-min}^{CB}$$

for conjugate beamforming may be determined by solving $R_{DU} = R_{CB,max-min}$ for $|\rho|^2$ using the bisection method (which is possible since $R_{CB}$ is a strictly decreasing function of $|\rho|^2$), where $R_{DU}$ is defined earlier and $R_{CB,max-min} = K \log_2(1+z)$, and z is found as:

$$z = \frac{P_{tot}}{2N_0\zeta_1} + \frac{1+\frac{\zeta_2}{\zeta_1}}{2|\rho|^2} - \sqrt{\left(\frac{P_{tot}}{2N_0\zeta_1} + \frac{1+\frac{\zeta_1}{\zeta_2}}{2|\rho|^2}\right)^2 - \frac{P_{tot}}{N_0\zeta_1|\rho|^2}},$$

$$\zeta_1 = \sum_{i=1}^{K-2} \frac{1}{\|h_i\|^2}, \zeta_2 = \frac{1}{\|h_{K-1}\|^2} + \frac{1}{\|h_K\|^2}$$

In some embodiments, assuming that the correlated users are at the same distance to the transmitter, the threshold value $$\rho_H = \rho_{max-min}^{CB}$$

for conjugate beamforming may be determined by solving $R_{DU}\, R_{CB,max-min}$ for $|\rho|^2$ using the bisection method, where $$R_{DU} = (K-1)\log_2\left(1+SNR\frac{K}{K-1}\right) \text{ and } R_{CB} = K\log_2\left(1+\frac{\zeta x^2}{\zeta|\rho|^2 x^2 + N_0}\right),$$

and $x^2$ is the positive root of $x^4(2\zeta(|\rho|^2)) + x^2(N_0K - P_{tot}\zeta|\rho|^2) - P_{tot}N_0 = 0$.

Assuming two correlated users out of K users, and max-min power allocation control, the threshold value $\rho_H$ may be determined as $$\rho_H = \rho_{max-min}^{ZF} = \left(1 - \frac{\zeta_2}{\frac{P_{tot}}{N_0(2^{\alpha_{max-min}} - 1)} - \zeta_1}\right)^{0.5}$$

for zero-forcing beamforming, where $$\alpha_{max-min} = \frac{R_{DU}}{K}.$$

In some embodiments, assuming that the correlated users are at the same distance to the transmitter, the threshold value $\rho_H$ may be determined as $$\rho_H = \rho_{max-min}^{ZF} = \left(1 - \frac{2}{\frac{KSNR}{(2^\gamma - 1)} - (K-2)}\right)^{0.5}$$

for zero-forcing beamforming, where $$\gamma = \frac{K-1}{K}\log_2\left(1+SNR\frac{K}{K-1}\right), SNR = \frac{\zeta P_{tot}}{KN_0},$$

$\zeta$ is the large scale fading coefficient, $P_{tot}$ is the total allocated power, and $N_0$ is the noise power at the receiver of a user.

Assuming two correlated users out of K users, and max-min power allocation control, the threshold value $\rho_H$ may be determined as $$\rho_H = \rho_{max-min}^{THP} = \left(1 - \frac{1}{\|h_K\|^2\left(\frac{P_{tot}}{N_0(2^{\alpha_{max-min}} - 1)} - \sum_{i=1}^{K-1}\frac{1}{\|h_i\|^2}\right)}\right)^{0.5}$$

for Tomlinson-Harashima pre-coding (THP).

In some embodiments, assuming that the correlated users are at the same distance to the transmitter, the threshold value $\rho_H$ may be determined as $$\rho_H = \rho_{max-min}^{THP} = \left(1 - \frac{1}{\frac{KSNR}{(2^\gamma - 1)} - (K-2)}\right)^{0.5}$$

for Tomlinson-Harashima pre-coding (THP).

FIG. 7 illustrates example threshold values as a function of the signal-to-noise ratio when there are only two correlated users and all the K=6 users have the same large-scale fading. The upper plot illustrates the threshold values for equal power control (power allocation which equalizes the SNR for all users when they are orthogonal) and the lower plot illustrates the threshold values for max-min power control.

For more than two correlated users out of K users, the above threshold values may be used as bounds for the threshold value $\rho_H$. Alternatively or additionally, $2/\pi$ may be used as a bound for the threshold value $\rho_H$, which is due to that this is the spatial correlation between two users having an angular separation of 1/M in a line-of-sight (LOS) scenario, where M is the number of antenna elements in the antenna array of the transmitter. In some embodiments, the threshold value may be chosen as the minimum value of these two bounds; above threshold values and $2/\pi$.

Selection of which user(s) should be discarded may be based on a function $$f(i) = \sum_{k=1, k \neq i}^{K} |\rho_{ik}| \text{ or } f(j) = \sum_{k=1, k \neq i}^{K} \frac{|\rho_{ik}|}{\|h_i\|^2}$$

that represents an accumulated correlation between user i and the other users of the plurality; possibly divided by the large-scale fading of user i.

Typically, the function value $f(\bullet)$ need only be determined for users that are prospect users for discarding. For example, users that are not comprised in any pair that have a spatial correlation value that falls on or above the threshold value $\rho_H$ are typically not prospect users for discarding.

According to one example, a set of users is determined, comprising two or more users that are comprised in at least one of the pairs that have a spatial correlation value that falls on or above the threshold value $\rho_H$. Each user of the set is associated with an accumulated correlation value defined as a sum of the spatial correlation values of the pairs comprising the user $$\left(\text{i.e., } f(i) = \sum_{k=1, k \neq i}^{K} |\rho_{ik}| \text{ or } f = \sum_{k=1, k \neq i}^{K} \frac{|\rho_{ik}|}{\|h_i\|^2} \text{ for user } i\right),$$

and one or more users of the set that has a highest accumulated correlation value is discarded.

The set may, for example, comprise all users that are comprised in at least one of the pairs that have a spatial correlation value that falls on or above the threshold value $\rho_H$, or only some of the users that are comprised in at least one of the pairs that have a spatial correlation value that falls on or above the threshold value $\rho_H$ (e.g., users with a highest function value $f(\bullet)$ or users of one or more pairs with highest spatial correlation value).

According to one example, a user is discarded that has a highest function value $f(\bullet)$ among the users of the pairs that have a spatial correlation value that falls on or above the threshold value $\rho_H$.

According to one example, a user is discarded that has a highest function value $f(\bullet)$ among the users of the pair that has a highest spatial correlation value among the pairs that have a spatial correlation value that falls on or above the threshold value $\rho_H$.

In some embodiments, one user is discarded at a time in an iterative manner and the threshold value $\rho_H$ is updated for each iteration. Optional steps 120, 130, 140 and 150 illustrate such an approach for reducing the plurality of users.

In optional step 120 the threshold value $\rho_H$ is determined. As mentioned above, the threshold value $\rho_H$ may be determined based on the number K of users of the plurality (i.e., the cardinality of the plurality), and may be further based on a user-specific signal-to-noise ratio (SNR) relating to the plurality of users.

In optional step 130, it is determined whether or not one or more pairs of users has a spatial correlation value that falls on or above the threshold value $\rho_H$, i.e., if there are any $\rho_{ij} \geq \rho_H$ or not.

When there are no spatial correlation values that falls on or above the threshold value $\rho_H$, i.e., when all $\rho_{ij} < \rho_H$ (N-path out of step 130), the plurality of users is not reduced and the method proceeds directly to step 160 for generation of the respective signals for transmission to the users of the plurality.

When there is at least one pair of users that has a spatial correlation value that falls on or above the threshold value $\rho_H$, i.e., when there is at least one $\rho_{ij} \geq \rho_H$ (Y-path out of step 130), a user is discarded in optional step 140. By discarding a user, a reduced plurality of users is provided.

The selection of which user should be discarded may, as elaborated in above, be based on the function $f(i)$, for user i. For example, a user may be discarded that has a highest function value $f(\bullet)$ among the users of the pair that has a highest spatial correlation value among the pairs that have a spatial correlation value that falls on or above the threshold value $\rho_H$.

In optional step 150, the threshold value $\rho_H$ is updated. Typically, the threshold value $\rho_H$ is updated based on the number of users of the reduced plurality (i.e., the cardinality of the reduced plurality), and may be further based on a user-specific signal-to-noise ratio (SNR) relating to the reduced plurality of users. For example, the same formula may be used for updating threshold value $\rho_H$ as was used for determining the threshold value $\rho_H$ in step 120 (but—due to the reduction of the plurality—using another, lower, cardinality K and possibly an altered user-specific SNR relating the reduced plurality of users).

Then, the method returns to optional step 130, where it is determined whether or not one or more pairs of users of the reduced plurality has a spatial correlation value that falls on or above the updated threshold value $\rho_H$.

When there are no longer any spatial correlation values that falls on or above the updated threshold value $\rho_H$ (N-path out of step 130), the reduced plurality of users is not further reduced and the method proceeds to step 160 for generation of the respective signals for transmission to the users of the reduced plurality.

When there is still at least one pair of users that has a spatial correlation value that falls on or above the updated threshold value $\rho_H$ (Y-path out of step 130), the reduced plurality of users is further reduced by discarding another user.

Thus, optional steps 140 and 150 are repeated until none of the spatial correlation values falls on or above the updated threshold value $\rho_H$.

Updating the threshold value $\rho_H$ after each reduction of the plurality, using the function $f(i)$ for selection of the user(s) to be discarded, and/or using the threshold value calculations elaborated on above to determine and update $\rho_H$ provides for more accurate discarding of users than the approach of US 2018/0352523 A1.

The following comprises two examples of discarding approaches (dropping algorithms): for conjugate beamforming (CB) and for zero-forcing (ZF) beamforming, respectively. For max-min power control, $\rho_{max-min}^{CB/ZF}$ could be used and for equal power control (power allocation which equalizes the SNR for all users when they are orthogonal) $\rho_{equ.}^{CB/ZF}$ could be used. For minimum mean-square error (MMSE) beamforming, the same algorithm(s) may be used with $\max[\rho^{ZF}, \rho^{CB}]$ as a lower bound for $\rho^{MMSE}$.

| Algorithm |
|---|
| Dropping algorithm for a channel of K users with CB with any number of correlated users |
| Input: H, K, $\frac{\zeta P_{tot}}{N_0}$ |
| 1: find $|\rho^{max}| = \max_{i,j \neq i} |\rho_{ij}|$ using H |
| 2: find $|\rho^{CB}|$ |
| 3: while $|\rho^{max}| > |\rho^{CB}|$ do |
| 4:    find m and n the indexes of users associated with $|\rho^{max}|$ |
| 5:    if $\Sigma_{l \neq m} |\rho_{ml}| > \Sigma_{l \neq n} |\rho_{nl}|$ then |
| 6:      drop user m |
| 7:    else |
| 8:      drop user n |
| 9:    end if |
| 10:   K = K − 1 |
| 11:   update H by removing the row of the dropped user |
| 12:   update $|\rho^{max}|$ using H |
| 13:   find $|\rho^{CB}|$ |
| 14: end while |

| Algorithm |
|---|
| Dropping algorithm for a channel of K users with ZF with any number of correlated users |
| Input: H, K, $\frac{\zeta P_{tot}}{N_0}$ |
| 1: find $|\rho^{max}| = \max_{i,j \neq i} |\rho_{ij}|$ using H |
| 2: find $|\rho^{ZF}|$ |
| 3: while $|\rho^{max}| > |\rho^{ZF}|$ do |

-continued

| Algorithm |
|---|
| 4:   find m and n the indexes of users associated with $\|\rho^{max}\|$ |
| 5:   if $\Sigma_{l\neq m} \|\rho_{ml}\| > \Sigma_{l\neq n} \|\rho_{nl}\|$ then |
| 6:     drop user m |
| 7:   else |
| 8:     drop user n |
| 9:   end if |
| 10:  K = K − 1 |
| 11:  update H by removing the row of the dropped user |
| 12:  update $\|\rho^{max}\|$ using H |
| 13:  find $\|\rho^{ZF}\|$ |
| 14: end while |

Regardless of whether the plurality of users have been reduced or not, the example method 100 proceeds to step 160, where the respective signals are generated for transmission to the users of the (possibly reduced) plurality. The generation of the respective signals comprise application of linear pre-coding (e.g., a conjugate beamforming approach, a zero-forcing approach, or a minimum mean square error approach) and/or non-linear pre-coding (e.g., a Tomlinson-Harashima pre-coding approach, or a vector pre-coding approach). Once generated, the respective signals may be transmitted to the users of the (possibly reduced) plurality as illustrated by optional step 170.

In step 160, the (possibly reduced) plurality of users are sorted into a first group and a second group based on the spatial correlation values $\rho_{ij}$ determined in step 110. Depending on the sorting criterion, one of the first and second groups may be empty in some scenarios.

Typically, the first group may comprise users that have no, or very limited, correlation to other users(s) of the (possibly reduced) plurality, while the second group may comprise users that have relatively high correlation to at least one other user of the (possibly reduced) plurality.

Then, the respective signals for transmission to the users of the first group are generated by application of linear pre-coding, and the respective signals for transmission to the users of the second group are generated by application of non-linear pre-coding.

This approach may provide lower complexity than using non-linear pre-coding for all users (for example, a complexity that is comparable to that of using linear pre-coding for all users), while providing performance (e.g., BER) equal, or at least similar or comparable, to that achievable by using non-linear pre-coding for all users. Put differently, this approach may reduce the required transmit power for a certain performance (e.g., BER) compared to using linear pre-coding for all users, while reducing the computational complexity for a certain performance (e.g., BER) compared to using non-linear pre-coding for all users. Compared to using non-linear pre-coding for all users, this approach may have less latency; particularly when using THP for the non-linear pre-coder since the feedback loop of the non-linear pre-coder (see FIG. 5) runs only for a subset of the users and not all the users.

In optional sub-step 161 a threshold value $\rho_L$ (also termed herein as a first correlation threshold value) is determined. The threshold value $\rho_L$ may be determined based on the number K of users of the (possibly reduced) plurality, and may be further based on a user-specific signal-to-noise ratio (SNR) relating to the (possibly reduced) plurality of users.

Typically, the threshold value $\rho_L$ is lower than, or equal to, the threshold value $\rho_H$ elaborated on above.

For example, when a zero-forcing approach is used for the linear pre-coding and a Tomlinson-Harashima pre-coding approach is used for the non-linear pre-coding, the threshold values may be set to $\rho_H = \rho_{max\text{-}min}^{THP}$ and $\rho_L = \rho_{max\text{-}min}^{ZF}$.

In optional sub-step 162, it is determined whether or not one or more pairs of (remaining) users has a spatial correlation value that falls on or above the threshold value $\rho_L$, i.e., if there are any $\rho_{ij} \geq \rho_L$ or not.

When there are no spatial correlation values that falls on or above the threshold value $\rho_L$, i.e., when all $\rho_{ij} < \rho_L$ (N-path out of step 162), the method proceeds directly to optional sub-step 169 where the respective signals for transmission to the users of the (possibly reduced) plurality are generated based on linear pre-coding.

When there is at least one pair of users that has a spatial correlation value that falls on or above the threshold value $\rho_L$, i.e., when there is at least one $\rho_{ij} \geq \rho_L$ (Y-path out of step 162), the method proceeds to sub-step 163 where the users are sorted into the first group and the second group based on the spatial correlation values $\rho_{ij}$.

For example, a particular user may be sorted into the first group when all pairs comprising the particular user have a spatial correlation value that falls below the threshold value $\rho_L$, and the particular user may be sorted into the second group when at least one pair comprising the particular user has a spatial correlation value that falls on or above the threshold value $\rho_L$.

Then, the respective signals for transmission to the users of the first group are generated by application of linear pre-coding as illustrated by sub-step 164, and the respective signals for transmission to the users of the second group are generated by application of non-linear pre-coding as illustrated by sub-step 166.

According to some embodiments, power allocation which equalizes the SNR for all the users when they are orthogonal may be applied for all users (regardless if they are in the first or second group). According to some embodiments, the power allocation applied for users is based on if they are in the first or second group. The latter is illustrated by the power allocation scaling illustrated in optional sub-step 165 for the first group of users and the power allocation scaling illustrated in optional sub-step 167 for the second group of users.

Thus, a first power allocation coefficient $\beta_{uncor}$ may be determined for the first group and a second power allocation coefficient $\beta_{cor}$ may be determined for the second group. Generating the respective signals for transmission to the users of the first group may comprise scaling by the first power allocation coefficient as illustrated in optional sub-step 165 and generating the respective signals for transmission to the users of the second group comprises scaling by the second power allocation coefficient as illustrated in optional sub-step 167.

The first and second power allocation coefficients may be equal or may have different values. Possible purposes of applying power allocation coefficients of different values may be to maximize the fairness among the users (e.g., to guarantee equally good service for all the users), to maximize throughput, to maximize harmonic mean, etc.

By allocating $P_{uncor}$ and $P_{cor}$ for the users of first group and second group, respectively, the first and second power allocation coefficients $\beta_{cor}$ and $\beta_{uncor}$ may be determined via $$\beta_{cor}^2 = \frac{P_{cor}}{\|\tilde{x}_{cor}\|_2^2}$$

-continued $$\beta_{uncor}^2 = \frac{P_{uncor}}{\|\tilde{x}_{uncor}\|_2^2}$$

where $\|\cdot\|_2^2$ denotes the norm-2, $P_{tot}$ is the total allocated power, $P_{uncor}=P_{tot}-P_{cor}$.

For example, when a zero-forcing approach is used for the linear pre-coding and a Tomlinson-Harashima pre-coding approach is used for the non-linear pre-coding, considering max-min power control, $$P_{cor} = \frac{tr(WW^H)}{\sum_{k \in first\ group} \frac{1}{\eta_i^2} + tr(WW^H)} P_{tot},$$

where $\eta_i=|h_i^T u_i^{ZF}|$, $u_i^{ZF}$ are the vectors of $U=H^H(HH^H)^{-1}$ scaled to unit-norm, and W is a $M \times n_{cor}$ matrix found by using the LQ decomposition of the channel matrix of all the users, as will be exemplified in connection with FIG. 5.

When a conjugate beamforming approach is used for the linear pre-coding in relation to max-min power control, $\beta_{cor}$ and $\beta_{uncor}$ may be determined via the bisection method.

Regardless of which power allocation approach is applied, the respective signals for transmission to the users of the first group and the respective signals for transmission to the users of the second group may be combined before transmission as illustrated in optional sub-step 168.

As mentioned before, the non-linear pre-coding may comprise a Tomlinson-Harashima pre-coding approach or a vector pre-coding approach, for example.

Generally in vector pre-coding, a perturbation vector $p \in C^{K \times 1}$ is added to the signal to be transmitted before linear pre-coding in such a way that it results in a reduced transmit power at the transmitter while yielding the same BER performance. The same power allocation diag(d) and pre-coding matrix U (CB, ZF, or MMSE) as in linear pre-coding is applied, and the output is multiplied by a scalar $\beta_{VP}$ which implements meeting of the power constraint $\|x^2\|^2=P_{tot}$, where x is the transmitted signal.

At the receiver, each user compensates the effects of the scalar and the linear pre-coding by multiplying the received signal by the inverse of the scalar $1/\beta_{VP}$ and by the inverse of a product of the square root of the power allocated to the user and the absolute value of the scalar product between the channel seen by the user and the pre-coding vector of the user $\alpha_i=1/|h_i^T u_i|\sqrt{d_i}$. Then, the user uses the modulo operator to remove the effect of the perturbation vector and estimates the received symbols.

In some embodiments when the non-linear pre-coding comprises a vector pre-coding approach which is used for the second group, a search is typically done to choose a suitable perturbation complex vector of the appropriate size $n_{cor} \times 1$. The search may an exhaustive search of the set of possible perturbation vectors, or may be limited to a sub-set of the set of possible perturbation vectors to reduce the complexity of the search. The sub-set may be chosen based on probability of suitability and/or based on random selection.

A suitable perturbation complex vector may, for example, be a vector that results in a reduced transmit power for the second group. For example, the perturbation vector may be found as the vector that—when the modulo operation is applied—minimizes the expected value of the correlation among the users of the second group; e.g., $$p = \underset{p'=(r+js)\Delta; r,s \in z^{n} cor}{\operatorname{argmin}} E[\tilde{x}_{cor}^H \tilde{x}_{cor}]$$

where $\tilde{x}_{cor}$ represents the signal to be transmitted for the second group before scaling, A is the divisor for the modulo operation at the receivers, and $E[\tilde{x}_{cor}^H \tilde{x}_{cor}]$ represents the expected value of the correlation among the users of the second group.

The squared scalars (power allocation coefficients) to be used for the first and second groups may be determined, respectively, as the power allocated to the group divided by the expected value of the correlation among the users of the group. The allocated power for each group may be determined based on any suitable power allocation strategy (e.g., max-min power control). FIG. 2 schematically illustrates an example apparatus 210 according to some embodiments. The example apparatus is a pre-coding apparatus for a multi-user, multi-antenna transmitter configured for transmission of respective signals to a plurality of users. For example, the multi-user, multi-antenna transmitter may be comprised in a base station (e.g., a base station for mobile communication and/or for drone communications). The example apparatus may, for example, be configured to cause performance of (e.g., to perform) one or more steps of the example method 100 or FIG. 1.

The example apparatus comprises a controller (CNTR; e.g., controlling circuitry or a controlling module) 200. The controller may comprise, or be otherwise associated with (e.g., be connectable, or connected, to) a list of users (LoU; e.g., kept in storing circuitry of the controller) 201. The list of users may be configured to comprise the plurality of users and/or the reduced plurality of users.

The controller is configured to cause determination, for each pair of users of the plurality, of a spatial correlation value for the pair of users (compare with step 110 of FIG. 1). To this end, the controller may comprise, or be otherwise associated with (e.g., be connectable, or connected, to) a correlation determiner (C_DET; e.g., correlation determination circuitry or a correlation determination module) 202. The correlation determiner may be configured to determine, for each pair of users of the plurality, the spatial correlation value for the pair of users.

The controller may also be configured to cause, when one or more pairs of users has a spatial correlation value that falls on or above a threshold value $\rho_H$, discarding of at least one user comprised in at least one of the one or more pairs (compare with steps 120, 130, 140 and 150 of FIG. 1).

The controller may be configured to cause determination of the threshold value $\rho_H$ based on the number of users of the plurality (compare with step 120 of FIG. 1). To this end, the controller may comprise, or be otherwise associated with (e.g., be connectable, or connected, to) a threshold determiner (TH_DET; e.g., threshold determination circuitry or a threshold determination module) 203. The threshold determiner may be configured to determine the threshold value $\rho_H$ based on the number of users of the plurality; and possibly on other factors as mentioned earlier.

The controller may be configured to cause determination of whether or not one or more pairs of users has a spatial correlation value that falls on or above the threshold value $\rho_H$ and to cause (when one or more pairs of users has a spatial correlation value that falls on or above the threshold value $\rho_H$) discarding of one user comprised in at least one of the one or more pairs to provide a reduced plurality of users (compare with steps 130 and 140 of FIG. 1). To this end, the controller may comprise, or be otherwise associated with (e.g., be connectable, or connected, to) a discarder (DC; e.g., discarding circuitry or a discarding module) 204. The discarder may be configured to determine whether or not one or more pairs of users has a spatial correlation value that falls on or above the threshold value $\rho_H$ and to discard one user comprised in at least one of the one or more pairs to provide a reduced plurality of users when one or more pairs of users has a spatial correlation value that falls on or above the threshold value $\rho_H$.

The controller may be configured to cause (when one or more pairs of users has a spatial correlation value that falls on or above the threshold value $\rho_H$) updating of the threshold value $\rho_H$ based on the number of users of the reduced plurality (compare with step 150 of FIG. 1). For example, the threshold determiner 203 may be configured to update the threshold value $\rho_H$ based on the number of users of the reduced plurality; and possibly on other factors as mentioned earlier.

The controller may be configured to cause repetition of the discarding and updating until none of the spatial correlation values falls on or above the updated threshold value $\rho_H$.

The controller is configured to cause generation of the respective signals for transmission to the users of the (possibly reduced) plurality by application of pre-coding (compare with steps 160, 164, 166 and 169 of FIG. 1). To this end, the controller may comprise, or be otherwise associated with (e.g., be connectable, or connected, to) a pre-coder (PC; e.g., pre-coding circuitry or a pre-coding module) 220. The pre-coder may be configured to generate the respective signals for transmission to the users of the (possibly reduced) plurality by application of pre-coding.

For the generation of the respective signals for transmission, the controller is configured to cause sorting of the plurality of users into a first group and a second group based on the spatial correlation values (compare with steps 161, 162 and 163 of FIG. 1). To this end, the controller may comprise, or be otherwise associated with (e.g., be connectable, or connected, to) a sorter (SORT; e.g., sorting circuitry or a sorting module) 205. The sorter may be configured to sort the plurality of users into a first group and a second group based on the spatial correlation values, possibly in cooperation with the threshold determiner 203, which may be further configured to determine the threshold value $\rho_L$ (compare with step 161 of FIG. 1).

For the generation of the respective signals for transmission, the controller is configured to cause generation of the respective signals for transmission to the users of the first group by application of linear pre-coding (compare with step 164 of FIG. 1), and generation of the respective signals for transmission to the users of the second group by application of non-linear pre-coding (compare with step 166 of FIG. 1). To this end, the pre-coder may comprise a linear pre-coder (LIN) 221 and a non-linear pre-coder (NLIN) 222.

For the generation of the respective signals for transmission, the controller may be configured to cause determination of a first power allocation coefficient for the first group and a second power allocation coefficient for the second group, scaling by the first power allocation coefficient for generation of the respective signals for transmission to the users of the first group (compare with step 165 of FIG. 1), and scaling by the second power allocation coefficient for the generation of the respective signals for transmission to the users of the second group (compare with step 167 of FIG. 1). To this end, the controller may comprise, or be otherwise associated with (e.g., be connectable, or connected, to) a power allocator (PAL; e.g., power allocation circuitry or a power allocation module) 223. The power allocator may be configured to determine the first and second power allocation coefficients and/or may be configured to scale by the first and second power allocation coefficients for generation of the respective signals.

For the generation of the respective signals for transmission, the controller may be configured to cause combination of the respective signals for transmission to the users of the first group with the respective signals for transmission to the users of the second group to provide a combined signal (compare with step 168 of FIG. 1). To this end, the controller may comprise, or be otherwise associated with (e.g., be connectable, or connected, to) a combiner (COMB; e.g., combining circuitry or a combining module) 224. The combiner may be configured to combine the respective signals for transmission to the users of the first and second groups to provide a combined signal.

The controller may also be configured to cause transmission of the respective signals to the users of the (possibly reduced) plurality (compare with step 170 of FIG. 1). To this end, the controller may comprise, or be otherwise associated with (e.g., be connectable, or connected, to) a transmitter (TX; e.g., transmitting circuitry or a transmission module) 230. The transmitter may be configured to transmit the respective signals to the users of the (possibly reduced) plurality.

FIG. 3 schematically illustrates an example apparatus 300 according to some embodiments. The example apparatus is a pre-coding apparatus for a multi-user, multi-antenna transmitter configured for transmission of respective signals to a plurality of users. For example, the multi-user, multi-antenna transmitter may be comprised in a base station (e.g., a base station for mobile communication and/or for drone communications). The example apparatus may, for example, be configured to cause performance of (e.g., to perform) one or more steps of the example method 100 or FIG. 1.

The example apparatus 300 comprises a correlation determiner (C_DET) 301, a threshold determiner (TH_DET) 303, a discarder (DC) 304, a linear pre-coder (LIN) 321, a non-linear pre-coder (NLIN) 322, a power allocator (PAL) 323 and a combiner (COMB) 324 (compare with corresponding functions of FIG. 2).

Based on channel knowledge, the correlation determiner 301 determines, for each pair of users of the plurality, the spatial correlation value for the pair of users, and the threshold determiner 303 determines the threshold values $\rho_L$ and $\rho_H$ based on the number of users of the plurality; and possibly on other factors as mentioned earlier.

The discarder 304 discards one or more users when one or more pairs of users has a spatial correlation value that falls on or above the threshold value $\rho_H$, and the threshold determiner 303 updates the threshold value $\rho_H$ as needed, until none of the spatial correlation values falls on or above the updated threshold value $\rho_H$.

The sorter 305 sorts the plurality of users into a first group and a second group based on the spatial correlation values (e.g., in comparison with the threshold value $\rho_L$), the linear pre-coder 321 applies linear pre-coding to the users of the first group, and the non-linear pre-coder 322 applies non-linear pre-coding to the users of the second group.

The power allocator 323 scales the signals of the users of the first group by the first power allocation coefficient and scales the signals of the users of the second group by the second power allocation coefficient, and the combiner 324 combines the respective signals for transmission to the users of the first and second groups to provide a combined signal for transmission.

FIG. 4 schematically illustrates an example linear pre-coder according to some embodiments via illustration of an example general model of linear precoding for K users.

The input comprises the intended uncorrelated, zero-mean and unit variance symbols s $\in C^{K \times 1}$, which are pre-coded by a diagonal matrix diag(p) in functional block 401 and a precoding matrix $U \in C^{M \times K}$ in functional block 402 to generate x=Udiag(p)s. The output vector $x \in C^{M \times 1}$ is transmitted through the channel H.

The vector $p=(\sqrt{d_1}, \ldots, \sqrt{d_K})^T$ with $d_i \in R^+$, $i=1, \ldots, K$ is used to adjust the power for each user with the constraint $\Sigma_i d_i = P_{tot}$. The matrix U with unit norm column vectors is used to compensate the channel effects. Typically, p is chosen based on a power allocation strategy (equal power allocation, equalizing power allocation, maximizing fairness, maximizing throughput, or maximizing harmonic mean) and U is found by scaling the precoding matrix to have unit norm column vectors u. The scaling may be realized as $H^H$ for CB, as $H^H(HH^H)^{-1}$ for ZF. For MMSE with equal power allocation, the scaling may be realized as $H^H(\vartheta I_K + HH^H)^{-1}$ for MMSE, wherein the superscript H denotes Hermetian, or conjugated, transposition and $\vartheta = KN_0/P_{tot}$.

FIG. 5 schematically illustrates an example non-linear pre-coder according to some embodiments via illustration of an example general model of non-linear THP for K users.

THP uses LQ-decomposition of the channel (H=LQ, where L is a lower triangular matrix of size K×M and Q is an M×M unitary matrix $QQ^H=Q^HQ=I_M$) and the modulo operator to remove the multi-user interference.

The input comprises the symbols s, which are encoded in functional block 501 to provide s as follows: $\tilde{s}_i=[s_i - \Sigma_{j=1}^{i-1} b_{ij}\tilde{s}_j]_\Delta$, $i=1, \ldots K$, where $[.]_\Delta$ is the modulo operator with divisor $\Delta$ and $b_{ij}$ is the i,j element of the lower triangular matrix B. The matrix B can be found by scaling the matrix L as B=LG, where G is a diagonal matrix causing the diagonal elements of B to be equal to 1. The output of functional block 502 is a vector $\tilde{x}$, which is generated by precoding s with a filter matrix W given by $W=Q^HG$.

Then, $\tilde{x}$ is adjusted by a scalar β as illustrated by 504 to meet the power constraint of the transmitter $\|x\|^2=P_{tot}$. The output vector x is transmitted through the channel.

The input symbols s may be subject to subtraction (as illustrated by 505) of a feedback of $\tilde{s}$ via functional block 503 which implements $y=(B-I)\tilde{s}$.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node (e.g., a base station).

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a wireless communication device or a network node 610. When loaded into the data processor, the computer program may be stored in a memory (MEM) 630 associated with or comprised in the data processor. According to some embodiments, the computer program may, when loaded into and run by the data processor, cause execution of method steps according to, for example, the method illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A pre-coding method of a multi-user, multi-antenna transmitter configured for transmission of respective signals to a plurality of users, the method comprising:
   determining, for each pair of users of the plurality, a spatial correlation value for the pair of users;
   sorting the plurality of users into a linear pre-coding group or a non-linear pre-coding group based on the spatial correlation values;

generating the respective signals for transmission to the users of the linear pre-coding group by application of linear pre-coding; and generating the respective signals for transmission to the users of the non-linear pre-coding group by application of non-linear pre-coding, wherein the plurality of users comprises a first user, a second user, and a third user, determining, for each pair of users of the plurality, a spatial correlation value for the pair of users comprises:
 for a first pair of users consisting of the first user and the second user, determining a first pairwise spatial correlation coefficient using a first channel estimate for the first user and a second channel estimate for the second user;
 for a second pair of users consisting of the first user and the third user, determining a second pairwise spatial correlation coefficient using the first channel estimate for the first user and a third channel estimate for the third user; and
 for a third pair of users consisting of the second user and the third user, determining a third pairwise spatial correlation coefficient using the second channel estimate for the second user and the third channel estimate for the third user, and sorting the plurality of users into a linear pre-coding group or a non-linear pre-coding group based on the spatial correlation values comprises:
 for the first user, using both the first pairwise spatial correlation coefficient and the second pairwise spatial correlation coefficient to determine whether to include the first user in the linear pre-coding group or the non-linear pre-coding group;
 for the second user, using both the first pairwise spatial correlation coefficient and the third pairwise spatial correlation coefficient to determine whether to include the second user in the linear pre-coding group or the non-linear pre-coding group; and
 for the third user, using both the second pairwise spatial correlation coefficient and the third pairwise spatial correlation coefficient to determine whether to include the third user in the linear pre-coding group or the non-linear pre-coding group.

2. The method of claim 1, wherein determining the spatial correlation value for a pair of users comprises calculating a normalized scalar product between channel estimates associated with the users of the pair.

3. The method of claim 1, wherein the linear pre-coding comprises one of a conjugate beamforming approach, a zero-forcing approach, and a minimum mean square error approach.

4. The method of claim 1, wherein the non-linear pre-coding comprises one of a Tomlinson-Harashima pre-coding approach, and a vector pre-coding approach.

5. The method of claim 1, further comprising determining a first power allocation coefficient for the linear pre-coding group and a second power allocation coefficient for the non-linear pre-coding group, wherein generating the respective signals for transmission to the users of the linear pre-coding group comprises scaling by the first power allocation coefficient and generating the respective signals for transmission to the users of the non-linear pre-coding group comprises scaling by the second power allocation coefficient.

6. The method of claim 1, further comprising:
 combining the respective signals for transmission to the users of the linear pre-coding group with the respective signals for transmission to the users of the non-linear pre-coding group to provide a combined signal; and
 transmitting the combined signal.

7. The method of claim 1, wherein sorting the plurality of users into the linear pre-coding group or the non-linear pre-coding group comprises sorting a particular user into the linear pre-coding group as a result of determining that all pairs comprising the particular user have a spatial correlation value that falls below a first correlation threshold value.

8. The method of claim 7, wherein the step of sorting the plurality of users into the linear pre-coding group or the non-linear pre-coding group comprises sorting the particular user into the non-linear pre-coding group when at least one pair comprising the particular user has a spatial correlation value that falls on or above the first correlation threshold value.

9. The method of claim 7, wherein the first correlation threshold value is based on at least one of: the number of users of the plurality and a user-specific signal-to-noise ratio relating to the plurality of users.

10. The method of claim 1, wherein the method further comprises:
 determining that a spatial correlation value for a first pair of uses satisfies a condition; and
 as a result of determining that the spatial correlation value for the first pair of users satisfied a condition, discarding at least one of the users comprised in the first pair of users.

11. A computer program product comprising a non-transitory computer readable medium storing a computer program comprising program instructions, the computer program being loadable into a data processing unit and configured to cause execution of the method of claim 1 when the computer program is run by the data processing unit.

12. An apparatus for a multi-user, multi-antenna transmitter configured for transmission of respective signals to a plurality of users, the apparatus comprising:
 controlling circuitry configured to cause:
 determination, for each pair of users of the plurality, of a spatial correlation value for the pair of users;
 sorting of the plurality of users into a linear pre-coding group and a non-linear pre-coding group based on the spatial correlation values;
 generation of the respective signals for transmission to the users of the linear pre-coding group by application of linear pre-coding; and
 generation of the respective signals for transmission to the users of the non-linear pre-coding group by application of non-linear pre-coding, wherein
 the plurality of users comprises a first user, a second user, and a third user,
 determining, for each pair of users of the plurality, a spatial correlation value for the pair of users comprises:
 for a first pair of users consisting of the first user and the second user, determining a first pairwise spatial correlation coefficient using a first channel estimate for the first user and a second channel estimate for the second user;
 for a second pair of users consisting of the first user and the third user, determining a second pairwise spatial correlation coefficient using the first channel estimate for the first user and a third channel estimate for the third user; and
 for a third pair of users consisting of the second user and the third user, determining a third pairwise spatial correlation coefficient using the second channel estimate for the second user and the third channel estimate for the third user, and sorting the plurality of users into a linear pre-coding group or a non-linear pre-coding group based on the spatial correlation values comprises:

for the first user, using both the first pairwise spatial correlation coefficient and the second pairwise spatial correlation coefficient to determine whether to include the first user in the linear pre-coding group or the non-linear pre-coding group;

for the second user, using both the first pairwise spatial correlation coefficient and the third pairwise spatial correlation coefficient to determine whether to include the second user in the linear pre-coding group or the non-linear pre-coding group; and for the third user, using both the second pairwise spatial correlation coefficient and the third pairwise spatial correlation coefficient to determine whether to include the third user in the linear pre-coding group or the non-linear pre-coding group.

13. The apparatus of claim 12, wherein determination of the spatial correlation value for a pair of users comprises calculation of a normalized scalar product between channel estimates associated with the users of the pair.

14. The apparatus of claim 12, wherein the linear pre-coding comprises one of a conjugate beamforming approach, a zero-forcing approach, and a minimum mean square error approach.

15. The apparatus of claim 12, wherein the non-linear pre-coding comprises one of a Tomlinson-Harashima pre-coding approach, and a vector pre-coding approach.

16. The apparatus of claim 12, wherein the controlling circuitry is further configured to cause determination of a first power allocation coefficient for the linear pre-coding group and a second power allocation coefficient for the non-linear pre-coding group, and wherein generation of the respective signals for transmission to the users of the linear pre-coding group comprises scaling by the first power allocation coefficient and generation of the respective signals for transmission to the users of the non-linear pre-coding group comprises scaling by the second power allocation coefficient.

17. The apparatus of claim 12, wherein the controlling circuitry is further configured to cause:

combination of the respective signals for transmission to the users of the linear pre-coding group with the respective signals for transmission to the users of the non-linear pre-coding group to provide a combined signal; and transmission of the combined signal.

18. The apparatus of claim 12, wherein sorting of the plurality of users into the linear pre-coding group or the non-linear precoding group comprises sorting of a particular user into the linear pre-coding group when all pairs comprising the particular user have a spatial correlation value that falls below a first correlation threshold value.

19. The apparatus of claim 18, wherein sorting of the plurality of users into the linear pre-coding group or the non-linear precoding group comprises sorting of the particular user into the non-linear pre-coding group when at least one pair comprising the particular user has a spatial correlation value that falls on or above the first correlation threshold value.

20. The apparatus of claim 18, wherein the first correlation threshold value is based on at least one of: the number of users of the plurality and a user-specific signal-to-noise ratio relating to the plurality of users.

* * * * *